(12) United States Patent
Chen

(10) Patent No.: US 11,912,570 B2
(45) Date of Patent: *Feb. 27, 2024

(54) LONG-LIFE DISCHARGE TUBE FOR OZONE GENERATOR

(71) Applicant: SUN HYDRAULICS (CHINA) CO., LTD., Kunshan (CN)

(72) Inventor: Zhihai Chen, Shenzhen (CN)

(73) Assignee: SUN HYDRAULICS (CHINA) CO., LTD., Kunshan (CN)

( * ) Notice: Subject to any disclaimer, the term of this patent is extended or adjusted under 35 U.S.C. 154(b) by 255 days.

This patent is subject to a terminal disclaimer.

(21) Appl. No.: 17/167,092

(22) Filed: Feb. 4, 2021

(65) Prior Publication Data

US 2022/0204343 A1 Jun. 30, 2022

(30) Foreign Application Priority Data

Dec. 30, 2020 (CN) .......................... 202023341828.3

(51) Int. Cl.
*C01B 13/11* (2006.01)
(52) U.S. Cl.
CPC .......... *C01B 13/11* (2013.01); *C01B 2201/14* (2013.01)
(58) Field of Classification Search
CPC . C01B 13/11; C01B 2201/14; C01B 2201/22; C01B 2201/24; C01B 2201/32;
(Continued)

(56) References Cited

U.S. PATENT DOCUMENTS 2,388,753 A  11/1945  Mallmann et al.
5,516,493 A   5/1996  Bell et al.
(Continued)

FOREIGN PATENT DOCUMENTS

CN   208320475 U   1/2019
EP     4021150 A1  6/2022
(Continued)

OTHER PUBLICATIONS

Machine translation of JP06-239605 (Year: 1994).*
(Continued)

*Primary Examiner* — Xiuyu Tai
(74) *Attorney, Agent, or Firm* — BROOKS KUSHMAN P.C.

(57) ABSTRACT

A long-life discharge tube for ozone generator is provided, including an air inlet tube, a connecting column, an ozone outlet tube, inner and outer quartz tubes, an outer copper foil, first and second high-voltage connecting components. The outer side of the connecting column fits closely to the inner quartz tube. The outer quartz tube is sleeved on the inner cylindrical component. An air gap is provided between the inner and outer quartz tubes. The outer side of the outer quartz tube fits closely to the copper foil whose length is less than that of the inner and outer quartz tubes. Two connecting components for generating high voltage for arcing are respectively connected to the inner cylindrical component and the outermost copper foil. This structure can prevent the oxidation and corrosion due to the electric spark on the connecting column, greatly improving the overall service life of the discharge tube.

8 Claims, 2 Drawing Sheets

(58) Field of Classification Search
CPC .......... C01B 2201/162; C01B 2201/64; C01B 2201/62; C01B 2201/34; C01B 2201/76; B01J 19/08; B01J 19/088; H01T 19/04; H01T 19/00

See application file for complete search history.

(56) References Cited

U.S. PATENT DOCUMENTS

| | | | |
|---|---|---|---|
| 5,573,733 | A | 11/1996 | Salama |
| 6,723,233 | B1 | 4/2004 | Barnes |
| 2008/0233021 | A1 | 9/2008 | Liou |
| 2011/0114571 | A1 | 5/2011 | Cannavino |
| 2015/0259203 | A1 | 9/2015 | Costello |
| 2017/0155231 | A1* | 6/2017 | Brauer ............... H01T 19/04 |
| 2019/0287763 | A1 | 9/2019 | Tsui |
| 2019/0387604 | A1 | 12/2019 | Fandrich et al. |
| 2022/0194828 | A1 | 6/2022 | Chen et al. |

FOREIGN PATENT DOCUMENTS

| | | | |
|---|---|---|---|
| GB | 420228 | A | 11/1934 |
| JP | 06-239605 | * | 4/1994 |
| JP | 2000348848 | A | 12/2000 |
| SU | 1754648 | A1 | 8/1992 |
| WO | 2014136063 | A2 | 9/2014 |

OTHER PUBLICATIONS

Extended European Search Report for EP Application No. 21155093.4-1108, dated Aug. 2, 2021, 6 Pages.
First Office Action for GB Application No. 2020395.6, dated Jun. 8, 2021, 5 Pages.
Extended European Search Report for Application No. 21214969.4, dated May 18, 2022, 9 Pages.
Communication Pursuant to Art. 94(3) EPC for EP Application No. 21255093.4-1108, dated May 3, 2023, 3 Pages.
Nonfinal Rejection for U.S. Appl. No. 17/553,520, dated Aug. 1, 2023, 28 Pages.
Amendment Under 37 C.F.R. § 1.111 for U.S. Appl. No. 17/553,520, filed Oct. 31, 2023, 12 Pages.
First Office Action for Chinese Application No. 202111543831.X, dated Nov. 2, 2023, 14 Pages (incl. English Translation).
McMaster-Carr—Metal Pipe and Pipe Fittings; (Year: 2018) 9 Pages <https://www.mcmaster.com/products/hydraulic-pipe-nipples/>.
Final Office Action dated Jan. 3, 2024 for related U.S. Appl. No. 17/553,520; 41 Pages.

* cited by examiner

LONG-LIFE DISCHARGE TUBE FOR OZONE GENERATOR

CROSS-REFERENCE TO RELATED APPLICATION

This application claims priority to Chinese Patent Application No. 202023341828.3, filed Dec. 30, 2020, the contents of which are incorporated herein by reference.

BACKGROUND

1. Technical Field

The present invention relates to a field of ozone technology, especially to a long-life discharge tube for ozone generator.

2. Description of Related Art

Ozone is an allotrope of oxygen, which will quickly decompose into oxygen and single oxygen atoms under room temperature and pressure. Oxygen atoms, which are very active and easily react with unsaturated compounds, have a strong oxidizing effect on bacteria, viruses and other microorganisms. Because of the instability, the remaining ozone can be reduced to oxygen without causing secondary pollution. Therefore, ozone has good bactericidal and antibacterial effects and is beneficial to environmental protection.

The generation methods of artificial ozone can be divided into photochemistry method, electrochemistry method, atomic radiation method and corona discharge method according to the principle. Among them, most ozone sources for industry use are generated by the corona discharge method. The basic principle of the corona discharge method is that oxygen-containing gases generate a corona discharge with the high-frequency and high-voltage electric field, then the free high-energy electrons in the corona dissociate oxygen molecules, and then ozone molecules are polymerized by gas collision reaction. The corona discharge type ozone generating tube is currently the most widely used ozone generating device with the lowest relative energy consumption, the largest output and the highest market share, which is a special equipment for producing ozone by corona discharge method, and the ozone generating tube is the key components of it. The discharge device includes an outer electrode, an inner electrode and a dielectric, in which the dielectric is arranged on the outer surface of the outer electrode, and the outer electrode is sleeved around the inner electrode with a discharge air gap between them. The production and yield of ozone and the service life of the ozone generating tube are closely related to the electrode, the dielectric and working temperature of the ozone generating tube.

The discharge process of the ozone generating tube is that when the voltage applied between the outer electrode and the inner electrode gradually increases, the electric field between the two electrodes is also enhanced, especially, the electric field at the edge of the outer electrode is more pronounced due to the skin effect. When the strength of the electric field is increased to the breakdown strength of oxygen-containing gas like air or oxygen, due to the dielectric insulation, the gas near the outer electrode will cause corona discharge. The above-mentioned working conditions are similar to capacitors, in both of which energy is transferred in the form of charging and discharging and part of the charged electrons are used to dissociate oxygen atoms.

However, the current discharge tube of ozone generator on the market requires a high voltage to be applied between the two metal electrodes when generating ozone. This high voltage breaks down the small air gap between the two metal electrodes, generating an arc, and then ionizing the air and producing ozone. In this process, the arc is in direct contact with the metal electrodes, which causes the metal surface to oxidize and corrode, and a large amount of oxides are generated, resulting in adverse effect to the service life of the discharge tube of ozone generator.

Figure 1:
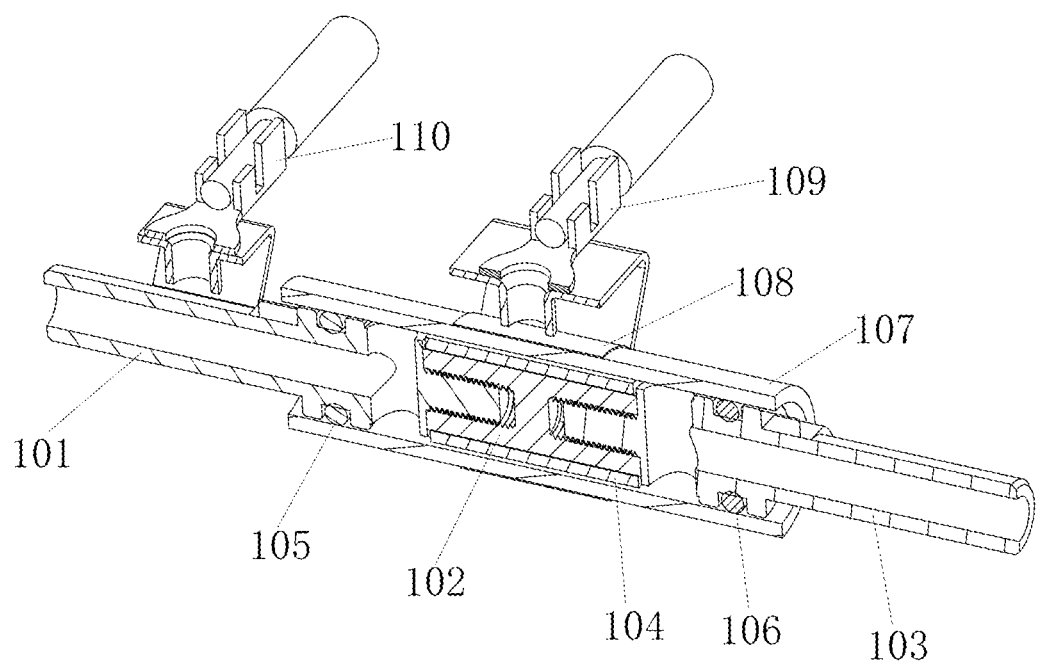
FIG. 1 shows a schematic view of the internal structure of the long-life discharge tube for ozone generator according to the present application.

The reference signs in the drawings are as follows: 101, air inlet tube; 102, connecting column; 103, ozone outlet tube; 104, outer quartz tube; 105, air inlet tube seal; 106, ozone outlet tube seal; 107, outer quartz tube; 108, outer copper foil; 109, first high-voltage connecting component; 110, second high-voltage connecting component.

DETAILED DESCRIPTION

The present application will be further described below with reference to the accompanying drawings for further clearly and fully discussing the technical solutions of the present invention.

Figure 2:
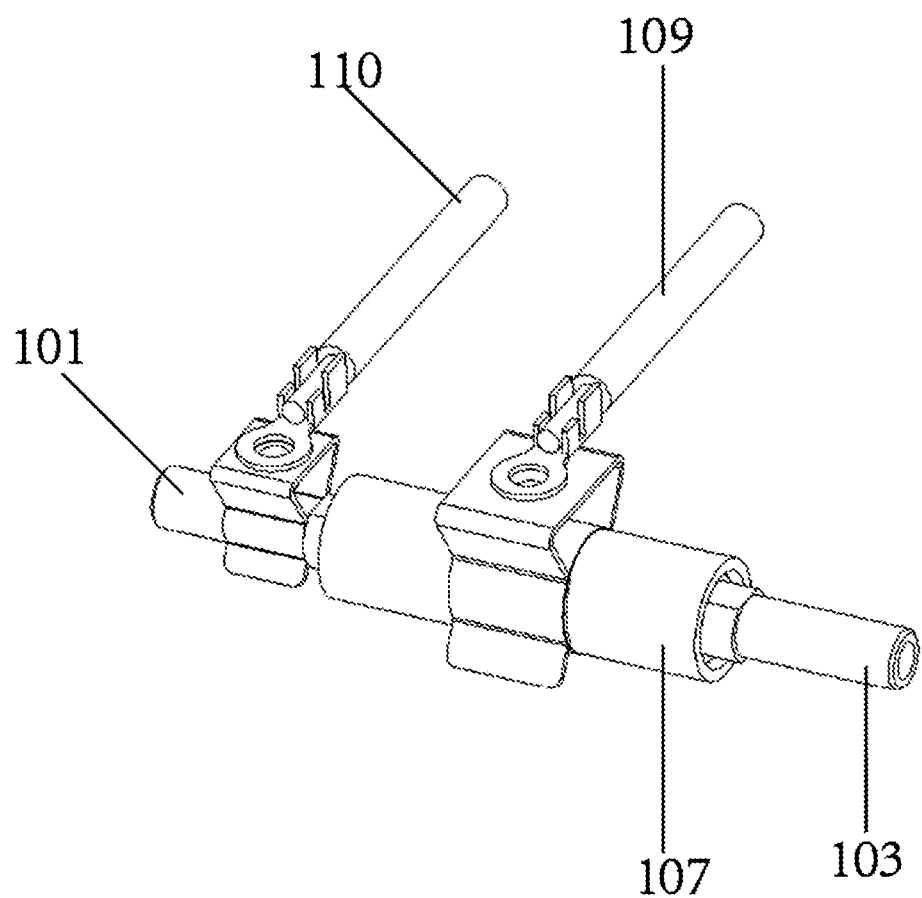
FIG. 2 shows a schematic view of the external overall structure of the long-life discharge tube for ozone generator according to the present application.

With reference to FIGS. 1 to 2, the internal structure of an long-life discharge tube for ozone generator provided in the present application is shown, including an air inlet tube 101, a connecting column 102, an ozone outlet tube 103, an inner quartz tube 104, an outer quartz tube 107, an outer copper foil 108, a first high-voltage connecting component 109 and a second high-voltage connecting component 110. The air inlet tube 101, the connecting column 102 and the ozone outlet tube 103 are connected in sequence to form an inner cylindrical component. The outer side of the connecting column 102 fits closely to the inner quartz tube 104. The outer quartz tube 107 is sleeved on the inner cylindrical component through an air inlet tube seal 105 and an ozone outlet tube seal 106. An air gap is provided between the inner quartz tube 104 and the outer quartz tube 107. The outer copper foil 108 fits closely to the outer side of the outer quartz tube 107. The first high-voltage connecting component 109 is connected to the outer copper foil 108, and the second high-voltage connecting component 110 is connected to the air inlet tube 101. It should be noted that the connection between the second high-voltage connecting component 110 and the ozone outlet tube 103 can also achieve a reasonable electrical connection.

The discharge tube for ozone generator in the embodiment of the present application is composed of a multi-layer cylindrical structure, in which the innermost layer is an inner cylindrical component with a cylindrical metal structure. The outer side of the connecting column 102 fits closely to the inner quartz tube 104. The outer quartz tube 107 is sleeved on the inner cylindrical component. A small air gap is provided between the outer quartz tube 107 and the inner quartz tube 104 to provide high-voltage discharge. The outer side of the outer quartz tube 107 fits closely to the outer copper foil 108 whose length is less than the length of the outer quartz tube 107 and the inner quartz tube 104. Two connecting components for generating high voltage for arcing are respectively connected to the inner cylindrical component and the outermost outer copper foil 108. This structure can prevent the oxidation and corrosion due to the electric spark on the connecting column 102 in the inner cylindrical component and the outer copper foil, greatly improving the overall service life of the discharge tube of ozone generator. And in the case the inner quartz tube 104 or the outer quartz tube 107 is damaged separately, the intensity of the discharge arc will not increase significantly, and there won't be a large amount of excess heat generated to affect the safe operation of the ozone generator.

The long-life discharge tube for ozone generator provided in the present embodiment will be further described below.

As an embodiment, each of the air inlet tube 101 and the ozone outlet tube 103 is provided with a threaded column at an end, and both ends of the connecting column 102 are provided with threaded holes adapted to the threaded columns. Specifically, one end of the air inlet tube 101 is provided with a threaded column, and one end of the ozone outlet tube 103 is also provided with a threaded column which is the same as that of the air inlet tube. Both ends of the connecting column 102 are provided with the same threaded holes that are matched with the threaded columns of the air inlet tube 101 and the ozone outlet tube 103. Through the rotary connection of the threaded holes and the threaded columns, the air inlet tube 101, the connecting column 102 and the ozone outlet tube 103 are connected in sequence to form an inner cylindrical component. It should be noted that the threaded column on the air inlet tube 101 and the threaded column on the ozone outlet tube 103 can be different, but the threaded holes at the ends of the connecting column 102 must be capable of rotationally connected with these two different threaded columns. It should be noted that the air inlet tube 101, the connecting column 102 and the ozone outlet tube 103 can be connected in any type of appropriate way to form a similar structure.

As an embodiment, the air inlet tube 101 is provided with an air side hole near the connecting column 102, and the ozone outlet tube 103 is provided with an ozone side hole near the connecting column 102. Specifically, air flows through the air inlet tube 101 and enters the air gap between the inner quartz tube 104 and the outer quartz tube 107 through the air side hole. After the ionization ozone reaction is completed, the ozone flows through the ozone side hole and flows out through the ozone outlet tube 103.

As an embodiment, the air inlet tube 101 is provided with an inlet tube groove at a position close to the connecting column 102, and an air inlet tube seal 105 is provided in the inlet tube groove. The ozone outlet tube 103 is provided with an outlet tube groove at a position close to the connecting column 102, and an ozone outlet tube seal 106 is provided in the outlet tube groove. The outer quartz tube 107 is sleeved on the inner cylindrical component through the air inlet tube seal 105 and the ozone outlet tube seal 106.

As an embodiment, the air inlet tube seal 105 and the ozone outlet tube seal 106 are both O-shaped structures. In other embodiments, any other suitable form of sealing element may be used. Each seal is configured to engage with the outer surface of the inner cylindrical component and the inner surface of the outer quartz tube 107 to prevent air and/or ozone gas from leaking from the inner cylindrical component during use.

As an embodiment, the air inlet tube 101 and the ozone outlet tube 103 have the same structure. Specifically, the air inlet tube 101 and the ozone outlet tube 103 are both hollow inside, and provide channels for air and ozone to flow respectively.

As an embodiment, the air inlet tube 101, the connecting column 102 and the ozone outlet tube 103 are all made of metal materials. Specifically, the inner cylindrical component formed by their sequentially connection is also of a metal material.

As an embodiment, the lengths of the outer quartz tube 107 and the inner quartz tube 104 are both greater than the length of the outer copper foil 108. Specifically, the length of the outer copper foil 108 refers to the length in the axial direction of the outer quartz tube 107 after the outer copper foil 108 is wrapped and fitted on the outer wall of the outer quartz tube 107. The lengths of the outer quartz tube 107 and the inner quartz tube 104 refer to their respective axial lengths.

As an embodiment, the outer diameters of the air inlet tube 101 and the ozone outlet tube 103 are both larger than the outer diameter of the connecting column 102. Specifically, because the outer side of the connecting column 102 fits closely to the inner quartz tube 104, in the case the outer diameters of the air inlet tube 101 and the ozone outlet tube 103 are slightly larger than the outer diameter of the connecting column 102, the air inlet tube 101 and the ozone outlet tube 103 can fix the inner quartz tube 104 in the middle after the air inlet tube 101, the connecting column 102 and the ozone outlet tube 103 are sequentially connected.

As an embodiment, the numbers of the air inlet tube seal 105 and the ozone outlet tube seal 106 are both one. Specifically, the air inlet tube seal 105 is arranged on the side of the air inlet tube 101 close to the connecting column 102, and the ozone outlet tube seal 106 is arranged on the side of the ozone outlet tube 103 close to the connecting column 102.

As an embodiment, the operation process is as follows, after the first high-voltage connecting component 109 and the second high-voltage connecting component 110 are connected with an appropriate high voltage, the air in the air gap between the inner quartz tube 104 and the outer quartz tube 107 will be broken down by this voltage and an arc is generated to ionize the air to produce ozone. Since the length of the outer copper foil 108 is less than the length of the inner quartz tube 104, the range of the arc generated will not exceed the length of the inner quartz tube 104 and will not act on the connecting column 102 and the air inlet tube 101 and the ozone outlet tube 103. In the same way, since the length of the outer copper foil 108 is also less than the length of the outer quartz tube 107, the arc will not act on the outer copper foil 108. The arc will only be generated in the two layers of quartz tubes. In this way, the metal oxidation and corrosion to the outer copper foil 108 and the connecting column 102 by electric sparks are prevented, the aging of the components are delayed, and the service life of the product is improved.

It should be noted that due to the existence of the two layers of quartz tubes, when the inner quartz tube 104 or the outer quartz tube 107 is damaged separately, the equivalent discharge gap between the outer copper foil 108 and the metal surface of the connecting column 102 will not be reduced significantly, so the intensity of the discharge arc will not increase significantly, and there won't be a large amount of excess heat generated to affect the safe operation of the ozone generator.

It should be noted that the present application may have other various embodiments. Modifications and variations made by those skilled in the art based on the embodiments according to the present application without any creative work also fall within the scope of the present application.

What is claimed is:

1. A long-life discharge tube for ozone generator, comprising an air inlet tube, a connecting column, an ozone outlet tube, an inner quartz tube, an outer quartz tube, an outer copper foil, a first connecting component and a second connecting component;
    wherein the air inlet tube, the connecting column and the ozone outlet tube are connected in sequence to form an inner cylindrical component;
    wherein an outer side of the connecting column fits closely to the inner quartz tube;
    wherein the outer quartz tube is sleeved on the inner cylindrical component;
    wherein an air gap is provided between the inner quartz tube and the outer quartz tube;
    wherein the outer copper foil fits closely to an outer side of the outer quartz tube;
    wherein the first connecting component is connected to the outer copper foil, and the second connecting component is connected to the air inlet tube;
    wherein each of the air inlet tube and the ozone outlet tube is provided with a threaded column at an end, and both ends of the connecting column are provided with threaded holes adapted to the threaded columns; and
    outer diameters of the air inlet tube the ozone outlet tube are both larger than an outer diameter of the connecting column.

2. The long-life discharge tube for ozone generator according to claim 1, wherein the air inlet tube is provided with an air side hole near the connecting column, and the ozone outlet tube is provided with an ozone side hole near the connecting column.

3. The long-life discharge tube for ozone generator according to claim 1, wherein the air inlet tube is provided with an inlet tube groove at a position close to the connecting column, an air inlet tube seal being provided in the inlet tube groove, and the ozone outlet tube is provided with an outlet tube groove at a position close to the connecting column, an ozone outlet tube seal being provided in the outlet tube groove,
    wherein the outer quartz tube is sleeved on the inner cylindrical component through the air inlet tube seal and the ozone outlet tube seal.

4. The long-life discharge tube for ozone generator according to claim 3, wherein the air inlet tube seal and the ozone outlet tube seal are both O-shaped structures.

5. The long-life discharge tube for ozone generator according to claim 1, wherein the air inlet tube and the ozone outlet tube have the same structure.

6. The long-life discharge tube for ozone generator according to claim 1, wherein the air inlet tube, the connecting column and the ozone outlet tube are all made of metal materials.

7. The long-life discharge tube for ozone generator according to claim 1, wherein the lengths of the outer quartz tube and the inner quartz tube are both greater than the length of the outer copper foil.

8. The long-life discharge tube for ozone generator according to claim 3, wherein the numbers of the air inlet tube seal and the ozone outlet tube seal are both one.

* * * * *